(12) United States Patent
Olderdissen

(10) Patent No.: US 11,275,719 B2
(45) Date of Patent: Mar. 15, 2022

(54) INCREMENTAL METADATA AGGREGATION FOR A FILE STORAGE SYSTEM

(71) Applicant: EMC IP Holding Company LLC, Hopkinton, MA (US)

(72) Inventor: Jan Ralf Alexander Olderdissen, Herrenberg (DE)

(73) Assignee: EMC IP HOLDING COMPANY LLC, Hopkinton, MA (US)

( * ) Notice: Subject to any disclaimer, the term of this patent is extended or adjusted under 35 U.S.C. 154(b) by 142 days.

(21) Appl. No.: 16/429,358

(22) Filed: Jun. 3, 2019

(65) Prior Publication Data

US 2020/0379955 A1    Dec. 3, 2020

(51) Int. Cl.
*G06F 16/18* (2019.01)
*G06F 16/13* (2019.01)
*G06F 16/23* (2019.01)

(52) U.S. Cl.
CPC .......... *G06F 16/1865* (2019.01); *G06F 16/13* (2019.01); *G06F 16/2379* (2019.01)

(58) Field of Classification Search
CPC .. G06F 16/1865; G06F 16/2379; G06F 16/13; G06F 16/2246; G06F 16/322; G06F 16/9027
USPC .................................. 707/703, 797, 828, 829
See application file for complete search history.

(56) References Cited

U.S. PATENT DOCUMENTS

| | | | |
|---|---|---|---|
| 5,319,780 A | 6/1994 | Catino et al. | |
| 7,844,646 B1* | 11/2010 | Deshmukh | G06F 16/10 707/825 |
| 7,945,756 B1* | 5/2011 | Britton | H04L 67/1097 711/170 |
| 9,753,960 B1* | 9/2017 | Troyanovsky | G06F 16/2228 |
| 2006/0074925 A1 | 4/2006 | Bixby et al. | |
| 2006/0106899 A1 | 5/2006 | Mcardle | |
| 2008/0077584 A1 | 3/2008 | Bchmann et al. | |
| 2008/0256138 A1* | 10/2008 | Sim-Tang | G06F 16/128 |
| 2009/0077097 A1* | 3/2009 | Lacapra | G06F 16/119 |

(Continued)

OTHER PUBLICATIONS

Non Final office action received for U.S. Appl. No. 16/429,327 dated Dec. 18, 2020, 36 pages.

(Continued)

*Primary Examiner* — Hares Jami

(74) *Attorney, Agent, or Firm* — Amin, Turocy & Watson, LLP

(57) ABSTRACT

The described technology is generally directed towards incremental aggregation of metadata for a file storage system. According to an embodiment, a system can comprise a memory and a processor that can execute the components stored in the memory. The components can comprise a scanner component that can accessing a data structure storage component that can store a first data structure, and a branch of the first data structure can comprise a node that comprises at least one descendent link to a descendant node. The scanner component can further traverse from a first node to a second node by employing a first descendent link. Further, the method comprises a data collector that can collect node data from the first node and the second node. The system can further comprise a rollup data generator to aggregate, upon occurrence of a condition, the node data, resulting in aggregated node data.

20 Claims, 10 Drawing Sheets

(56) References Cited

U.S. PATENT DOCUMENTS

| | | | |
|---|---|---|---|
| 2011/0016153 A1* | 1/2011 | Atta | G06F 16/282 |
| | | | 707/797 |
| 2013/0290301 A1 | 10/2013 | Victor | |
| 2018/0365272 A1* | 12/2018 | Sastry | G06F 16/2246 |
| 2019/0311047 A1* | 10/2019 | Guerra Delgado | G06F 16/188 |

OTHER PUBLICATIONS

Gilburg. Soft-deletion is actually pretty hard. https://medium.com/galvanize/, 2018, pp. 1-10. (Year: 2018).

Bass. Stacks, Queues, Depth First Search, and Breadth Frist Search. https://medium.com/@jamesonbass/, 2018, pp. 1-6. (Year:2018).

Non Final office action received for U.S. Appl. No. 16/429,413 dated Jan. 29, 2021, 27 pages.

Harris. The DAM Difference: Filename vs Metadata. http://digitalassetmanagementnews.org/features/, pp. 1-6. (Year: 2018).

Final Office action received for U.S. Appl. No. 16/429,327 dated Apr. 27, 2021, 25 pages.

Final office action received for U.S. Appl. No. 16/429,413 dated Jun. 14, 2021, 28 pages.

Office Action dated Oct. 1, 2021 for U.S. Appl. No. 16/429,327, 23 pages.

Office Action dated Dec. 1, 2021 for U.S. Appl. No. 16/429,413, 24 pages.

Office Action dated Jan. 25, 2022 for U.S. Appl. No. 16/429,327, 22 pages.

* cited by examiner

INCREMENTAL METADATA AGGREGATION FOR A FILE STORAGE SYSTEM

TECHNICAL FIELD

The subject application generally relates to data storage, and, for example, managing data storage systems, and related embodiments.

BACKGROUND

Data assets in the form of unstructured data continue to challenge companies who struggle to manage their expanding requirements. Some industries routinely utilize large amounts of data that can be frequently copied, moved, and retained, usually through irregular processes. Common storage issues for these types of industries can include a difficulty in assessing deep directory structures, over distributed storage platforms. Other problems can occur when disorganized storage systems are filled to capacity. The disorganization in these systems can prevent capacity from being reclaimed by being archived or deleted.

Different approaches to these issues include expanding storage system size with new equipment, instead of attempting to solve organization problems. Other approaches include disrupting workflows and restricting functions available to users, e.g., creating, modifying, and duplicating data.

SUMMARY

This Summary is provided to introduce a selection of representative concepts in a simplified form that are further described below in the Detailed Description. This Summary is not intended to identify key features or essential features of the claimed subject matter, nor is it intended to be used in any way that would limit the scope of the claimed subject matter.

According to an embodiment, a system can comprise a memory that stores computer executable components and a processor that can execute the computer executable components stored in the memory. The computer executable components can comprise a scanner component to execute processes that can include accessing a data structure storage component that can store a first data structure, wherein a branch of the first data structure can comprise a node that comprises at least one descendent link to a descendant node. The scanner component can further traverse from a first node to a second node by employing a first descendent link comprised in the first node. Further, the system can comprise a data collector that can collect first node data from the first node and second node data from the second node and copy the first node data and the second node data into a second data structure. The system can further comprise a rollup data generator to generate, upon occurrence of a condition, aggregated node data based on the second data structure.

According to another embodiment, a computer-implemented method can comprise accessing, by a system comprising a processor, a data structure storage component that can store a first data structure, wherein a branch of the first data structure can comprise a first node that can comprise at least one descendent link to a descendant node. The method can further comprise traversing from the first node to a second node by employing a first descendent link comprised in the first node, and collecting node data from the first node and the second node. aggregating, upon occurrence of a condition, the node data, resulting in aggregated node data.

According to another embodiment, a computer program product is provided. The computer program product can comprise machine-readable storage medium comprising executable instructions that, when executed by a processor, can facilitate performance of operations comprising accessing, by a system comprising a processor, a data structure storage component that stores a first data structure, wherein a branch of the first data structure comprises a first node that comprises at least one descendent link to a descendant node, and traversing from the first node to a second node by employing a first descendent link comprised in the first node. The operations can further comprise collecting node data from the first node and the second node. Further the method can comprise aggregating, upon occurrence of a condition, the node data, resulting in aggregated node data.

BRIEF DESCRIPTION OF THE DRAWINGS

The technology described herein is illustrated by way of example and not limited in the accompanying figures in which like reference numerals indicate similar elements, and in which.

DETAILED DESCRIPTION

Various aspects described herein are generally directed towards facilitating incremental aggregation of metadata for a file storage system, in accordance with one or more embodiments. As will be understood, the implementation(s)

described herein are non-limiting examples, and variations to the technology can be implemented.

Reference throughout this specification to "one embodiment," "one or more embodiments," "an embodiment," "one implementation," "an implementation," etc. means that a particular feature, structure, or characteristic described in connection with the embodiment/implementation is included in at least one embodiment/implementation. Thus, the appearances of such a phrase "in one embodiment," "in an implementation," etc. in various places throughout this specification are not necessarily all referring to the same embodiment/implementation. Furthermore, the particular features, structures, or characteristics may be combined in any suitable manner in one or more embodiments/implementations.

The computer processing systems, computer-implemented methods, apparatus and/or computer program products described herein employ hardware and/or software to solve problems that are highly technical in nature (e.g., facilitating the coordination of scanner component 122 and the database to reduce the number of database accesses required to generate aggregated data.), that are not abstract and cannot be performed as a set of mental acts by a human. For example, a human, or even a plurality of humans, cannot incrementally aggregate metadata for a potentially massive file storage system, with the same level of accuracy and/or efficiency as the various embodiments described herein. It should further be noted that, one or more embodiments can be implemented with features that can improve management of massive data systems.

Aspects of the subject disclosure will now be described more fully hereinafter with reference to the accompanying drawings in which example components, graphs and operations are shown. In the following description, for purposes of explanation, numerous specific details are set forth in order to provide a thorough understanding of the various embodiments. However, the subject disclosure may be embodied in many different forms and should not be construed as limited to the examples set forth herein.

Figure 1:
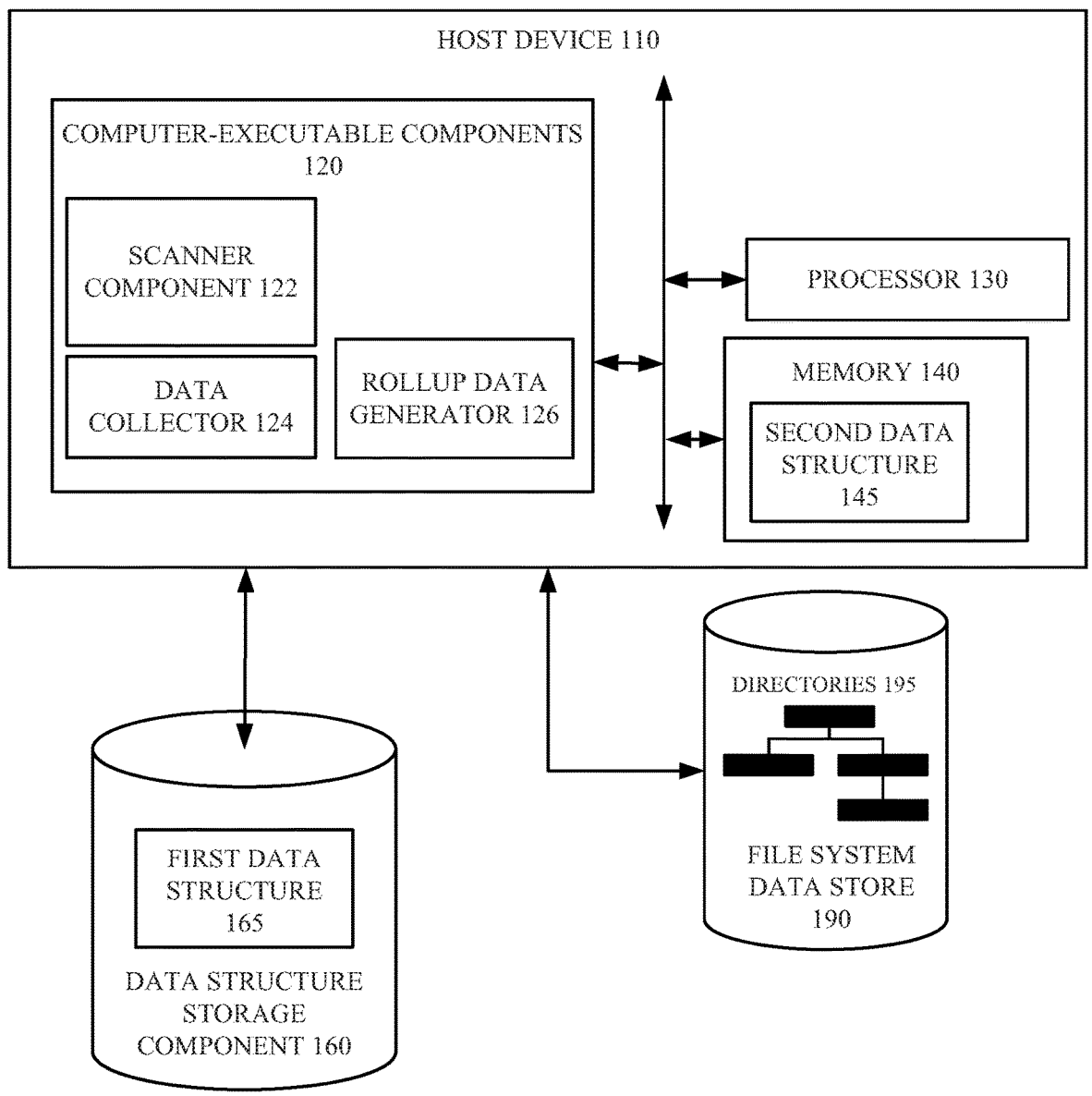
FIG. 1 illustrates a block diagram of an example, non-limiting system that can facilitate incremental aggregation of metadata for a file storage system, in accordance with various aspects and implementations of the subject disclosure.

It should be noted that, as used herein the term "roll-up information" is used to denote values aggregated across a folder and all its descendants. For example, rolled up "file size" covers the sum of the size of all files in a folder in addition to the sum of the size of all files of all descendant folders. In addition, the term "aggregated information" can also be used to describe roll-up information FIG. 1 illustrates a block diagram of an example, non-limiting system 100 that can facilitate incremental aggregation of metadata for a file storage system, in accordance with various aspects and implementations of the subject disclosure. Generally speaking, one of the functions that can be provided by one or more embodiments include, but are not limited to, facilitating coordination of scanner component 122 and the database to reduce the number of database accesses required to generate aggregated data.

Host device 110 can be coupled to database system 180, and a file system data store 190. In one or more embodiments host device 110 can collect metadata from file system data store 190, e.g., metadata describing the structure and contents of directories 195. Once collected, or more embodiments can process and store the metadata as structured data, e.g., in first data structure 165 of data structure storage component 160. In one or more embodiments, data structure storage component 160 can comprise a database system and first data structure 165 is a database created using the database system.

As discussed below, one or more embodiments can facilitate incremental aggregation of metadata for a file storage system by creating a second data structure 145 (also termed herein a "shadow data structure"). For this example, second data structure 145 is depicted as implemented using memory 140, but this example is non-limiting, and second data structure 145 can be created and used As discussed further below with FIG. 10, in some embodiments, memory 140 can comprise volatile memory (e.g., random access memory (RAM), static RAM (SRAM), dynamic RAM (DRAM), etc.) and/or non-volatile memory (e.g., read only memory (ROM), programmable ROM (PROM), electrically programmable ROM (EPROM), electrically erasable programmable ROM (EEPROM), etc.) that can employ one or more memory architectures. Further examples of memory 140 are described below with reference to system memory 1016 and FIG. 10. Such examples of memory 140 can be employed to implement any embodiments of the subject disclosure.

In some embodiments, processor 130 can comprise one or more of a central processing unit, multi-core processor, microprocessor, dual microprocessors, microcontroller, System on a Chip (SOC), array processor, vector processor, and/or another type of processor. According to multiple embodiments, processor 130 can implement one or more computer and/or machine readable, writable, and/or executable components and/or instructions that can be stored on memory 140. For example, processor 130 can perform various operations that can be specified by such computer and/or machine readable, writable, and/or executable components and/or instructions including, but not limited to, logic, control, input/output (I/O), arithmetic, and/or the like. Further examples of processor 130 are described below with reference to processing unit 1014 and FIG. 10. Such examples can be employed with any embodiments of the subject disclosure. Also, as discussed with FIG. 5 below, one or more embodiments can be implemented using some of the multitasking capacity of a multi-core processor.

In one or more embodiments, in an example approach to performing the operations above, processor 130 can execute computer-executable components 120, including, but not limited to, scanner component 122, data collector 124, and roll-up data generator 126.

In one or more embodiments, host device 110 can be used to implement systems that are designed for collecting, storing and utilizing metadata gathered from large file systems, e.g., CLARITYNOW provided by DELL EMC. Moreover, example system that include file system data store 190 functions, that can be used with one or more embodiments, include primary storage and archive platforms, e.g., ISILON® NETWORK ATTACHED STORAGE (NAS) and ECS® NATIVE OBJECT ARCHIVE provided by DELL EMC.

Figure 2:
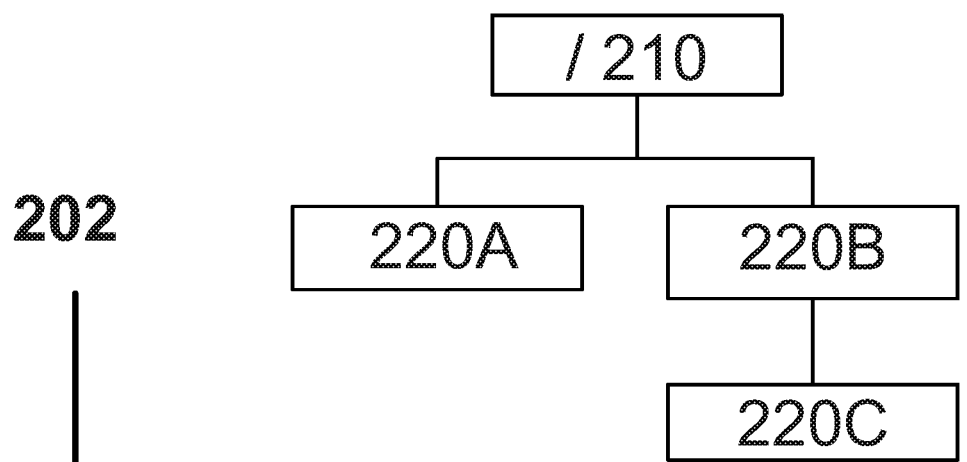
FIG. 2 illustrates a non-limiting example of a scanner component that can collect metadata describing a file system, in accordance with one or more embodiments described herein.
Figure 2:
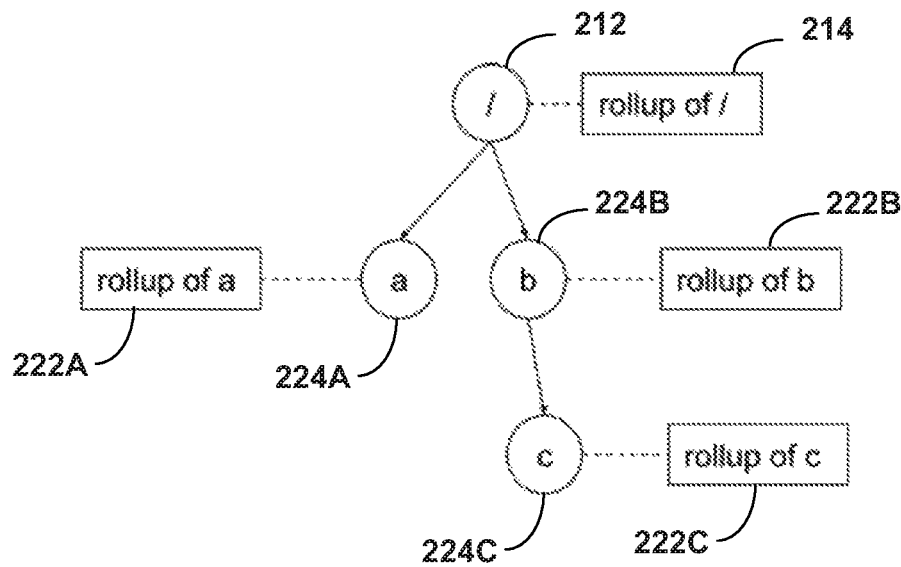

FIG. 2 illustrates a non-limiting example of a scanner component 250 that can collect metadata describing file system 202, in accordance with one or more embodiments described herein. Repetitive description of like elements and/or processes employed in respective embodiments is omitted for sake of brevity.

As used herein, file system 202 can contain files and have directories in a hierarchical structure, e.g., directories having one or more of an ancestor or descendant directory (also termed a subdirectory). One or more embodiments can employ a scanner component 250 to read the directory structure and contents of the directories and generate metadata structure 204, e.g., stored as first data structure 165 in data structure storage component.

As depicted, scanner component 250 can detect root directory 210 having subdirectories 220A and 220B, with subdirectory 220B having a subdirectory 220C. Based respectively on this example structure, root node 212 can have descendent nodes 225A and 224B, with descendent nodes 224B having descendent node 224C. In one or more embodiments, nodes 224A-C can have properties that describe the structure of the nodes and the contents of the nodes. An example database structure can have one record per node, with a key field corresponding to the path of the directory that corresponds to the node, e.g., a record for node 224C can have "/b/c" as a key field. In the discussion of curation with FIG. 4 below, different processes are described that are associated with the structure of this key field. Additional fields in the node records can include roll-up information, e.g., information that, because it is easily available, can improve the performance of different operations, e.g., searching and curating operations, described below.

Example information that can be "rolled up" to improve different functions can include the descendants of a node (e.g., a record for node 224B can include "/c") and the file contents of the directory corresponding to the node, e.g., a record for node 224B can include file1.txt, because this file is stored in subdirectory 220B. Further examples of database schemas that can support different embodiments are discussed below with FIG. 4.

Figure 3:
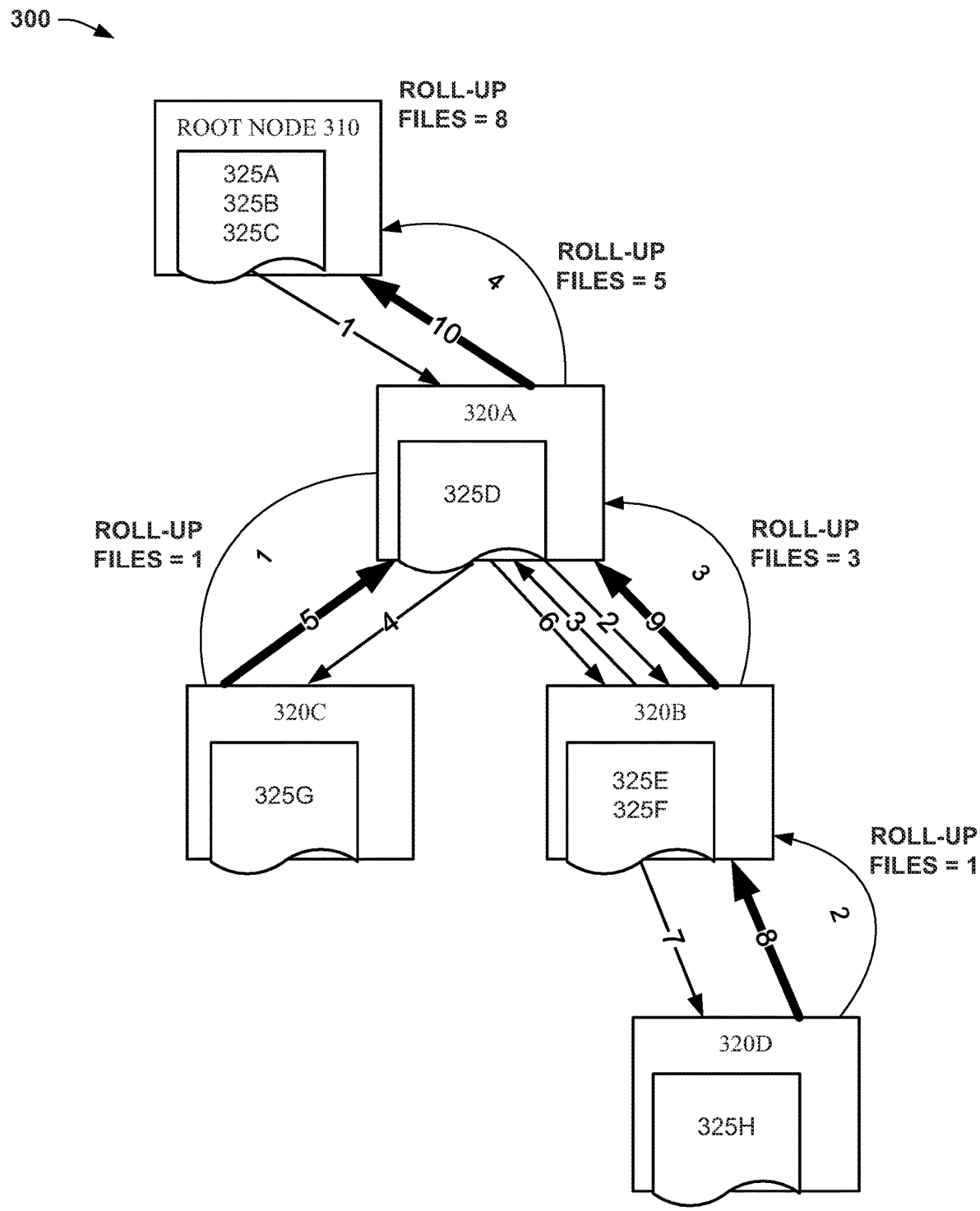
FIG. 3 illustrates a non-limiting example system that can use a data structure to facilitate incremental aggregation of metadata for a file storage system, in accordance with one or more embodiments described herein.

FIG. 3 illustrates a non-limiting example system 300 that can use data structure 165 to facilitate incremental aggregation of metadata for a file storage system, in accordance with one or more embodiments described herein. Repetitive description of like elements and/or processes employed in respective embodiments is omitted for sake of brevity.

In one or more embodiments, scanner component 122 can access a data structure storage component 160 that can store a first data structure 165 (e.g., a database) comprising nodes (e.g., database records) that can comprise at least one of an ancestor link to an ancestor node or a descendent link to descendent node (e.g., at least one database field referencing the path of an ancestor or descendent node), with a branch comprising at least one descendent link.

It should be noted that, as used herein, a process described as "traversing" nodes in a data structure can refer to a process accessing the data structure (e.g., as described for scanner component 122 above), and incrementally using links within the nodes of the data structure to load additional nodes for analysis. Thus, as depicted, scanner component 122 can traverse from a first node (e.g., root node 310) to a second node (e.g., node 320A) by employing a first descendent link comprised in the first node.

As described herein, one or more embodiments can employ a data collector 124 to collect node data from the first node (e.g., root node 310) and the second node 320A. As used for one or more embodiments herein, node data can broadly be applied to characteristics of the node. In an example where the nodes 310 and 320A-D correspond to directories in a file system data, objects 325A-H which are referenced by the nodes can correspond to files in the directories. Thus, example node data can include, but is not limited to, a number of files in a directory and a total size of the files in the directory. For the example depicted in FIG. 3, the node data described is the number of objects 325A-C (e.g., files) in the directory. Thus, data collector 124 can retrieve this information from root node 310 and node 320A.

In one or more embodiments, the node data collected during the traversal by scanner component 122 can be stored in a second data structure 145. This second data structure 145 can be implemented, in one or more embodiments, by temporarily employing memory 140, e.g., to utilize the speed of memory 140 for processing of the nodes. Thus, in this example, for root node 310, a value of 3 can be stored in the second data structure 145. As discussed further with FIG. 6 below, one or more embodiments can use the data stored in the second data structure 145 improve performance, consistency, and accuracy of the aggregated data.

Continuing with the example for other nodes of FIG. 3, in one or more embodiments, when scanner component 122 analyzes a node, the number of descendent nodes linked to the analyzed node can be determined and as discussed further with FIG. 5 below, if there is more than one descendant node, the other descendent nodes can be tagged as active nodes for processing. For example, node 320A includes two descendant nodes, e.g., nodes 320B-C. In one or more embodiments, one of the branches of nodes is selected for further analysis (e.g., node 320B), then, when the selected branch (e.g., 320B and 320D) has been analyzed (e.g., node 320D has no descendants shown), scanner component 122 can return to the active branch of nodes (e.g., node 320C). It should be noted that, one or more embodiments can analyze multiple branches at the same time, e.g., by employing multiple instances of scanner component 122 executed by multiple threads, as discussed with FIG. 5 below.

Continuing the example, scanner component determines that node 320A contains one object (e.g., 325D), stores this value in the second data structure 145, moves to node 320B, where two objects (e.g., 325E-F) are detected and stored in the second data structure 145. Finishing the branch, when scanner component moves to node 320D, a determination is made that the node has no descendant links to descendant nodes.

In one or more embodiments, the determination that a node has no descendant nodes is a condition that can trigger a series of actions. Generally speaking, this condition can cause the scanner component to reverse direction back up the branch of nodes (e.g., 320D to 320B to 320A) until a point is reached with active branches to be analyzed (e.g., node 320A, as discussed above). As scanner component 122 moves back from a node, in one or more embodiments, the value stored for the node in the secondary data structure can be retrieved used to generate values that can aggregate node data from descendent nodes. Once the values are retrieved from second data structure 145, these values and the aggregate values generated, can be written to non-volatile memory, e.g., first data structure 165.

Thus, as depicted in FIG. 3, upon moving to node 320B from 320D, a value of 1 can be retrieved from second data structure 145, written to first data structure 165, and removed from second data structure 145, e.g., in a manner similar to clearing a cache for use by other values. Because node 320D has no descendants, in this example, there is no separate aggregate value to generate based on descendent nodes. The aggregate value (e.g., the total number of files for a node, and descendants) for node 320D is the same as the non-aggregated value, e.g., 1.

Also, upon moving from a node to an ancestor node (e.g., node 320D to 320B), one or more embodiments can reference the aggregated value generated for the previous node, e.g., roll-up files=1, as depicted in FIG. 3. In one or more embodiments, this value can be combined with the non-aggregated value of the present node (e.g., retrieved from the second data structure, node 320B has 2 objects), to generate the aggregated node data for the present node (e.g., aggregated file count for node 320B is 3). In accordance with the processes described above, upon leaving node 320B, the data values generated for this node are written to first data structure 165 and the aggregated number of files for nodes 320B and descendants (e.g., 320D) is persisted for use with node 320A, e.g., 3 files.

In one or more embodiments, as noted above, because node 320A is an active node (e.g., has active branches to be aggregated), the movement by scanner component back up the processed branch is stopped until the active, unprocessed branch has been processed. Thus, scanner component 122 traverses to node 320C, where a value of one file is stored in second data structure 145, and as with the node 320D without descendants, because node 320C has no descendants, this value of 1 file is also an aggregate value to persist (e.g., roll-up=1) for processing with an ancestor node, e.g., node 320A.

When the aggregate file value of node 320C (1) is further aggregated with the aggregate total of files (3) from node 320B, and the non-aggregated number of files in node 320A, the aggregate value for node 320A is determined to be 5, and written to second data structure 145. When scanner component 122 moves to root node 310, node 320A has values retrieved from second data structure 145 and written to first data structure 165.

Considering the above process, it is important to note that, in this example, the aggregate calculations were only performed once, and the determined data was only written to first data structure 165 once. Because, in one or more embodiments, first data structure 165 can be implemented in a database system, this single write of data per node can reduce problems due to locking records. One or more embodiments can facilitate coordination of scanner component 112 and the database to reduce the number of database accesses required to generate aggregated data.

It should also be noted that one or more embodiments of system 100 can employ different techniques to guiding scanner component 122, while this component is traversing first data structure 165. For example, as discussed below, scanner component 122 can not only move down a branch of nodes (e.g., by employing a descendent link that can be in nodes, other than the last node in a branch), scanner component 122 can also navigate up a branch of nodes. In one or more embodiments, nodes do not include an ancestor link to follow, so other approaches can be used.

In one or more embodiments of scanner component 122 can maintain an object that persists information about a current and previous positions of scanner component 122. For example, to facilitate navigation by scanner component 122 to ancestor nodes, scanner component can persist links back to previous ancestor nodes. Additional information that can be persisted by scanner component 122 can include records of outstanding tasks to be performed, e.g., currently active nodes with active branches of nodes that have not been analyzed and aggregated. For example, as discussed above, node 320C was identified as a second descendent node for node 320A and, when node 320B was processed, node 320C was tagged as an active node, for later analysis. As described above, scanner component 122 can persist not only the key values for active nodes, but also a running count of active nodes.

Initially, as with the other nodes discussed, an object in node 320D is detected and data corresponding to the object can be stored in the second data structure. As noted above, this second data structure can be operated from memory 140, and this use of volatile memory can be temporary.

Figure 4:
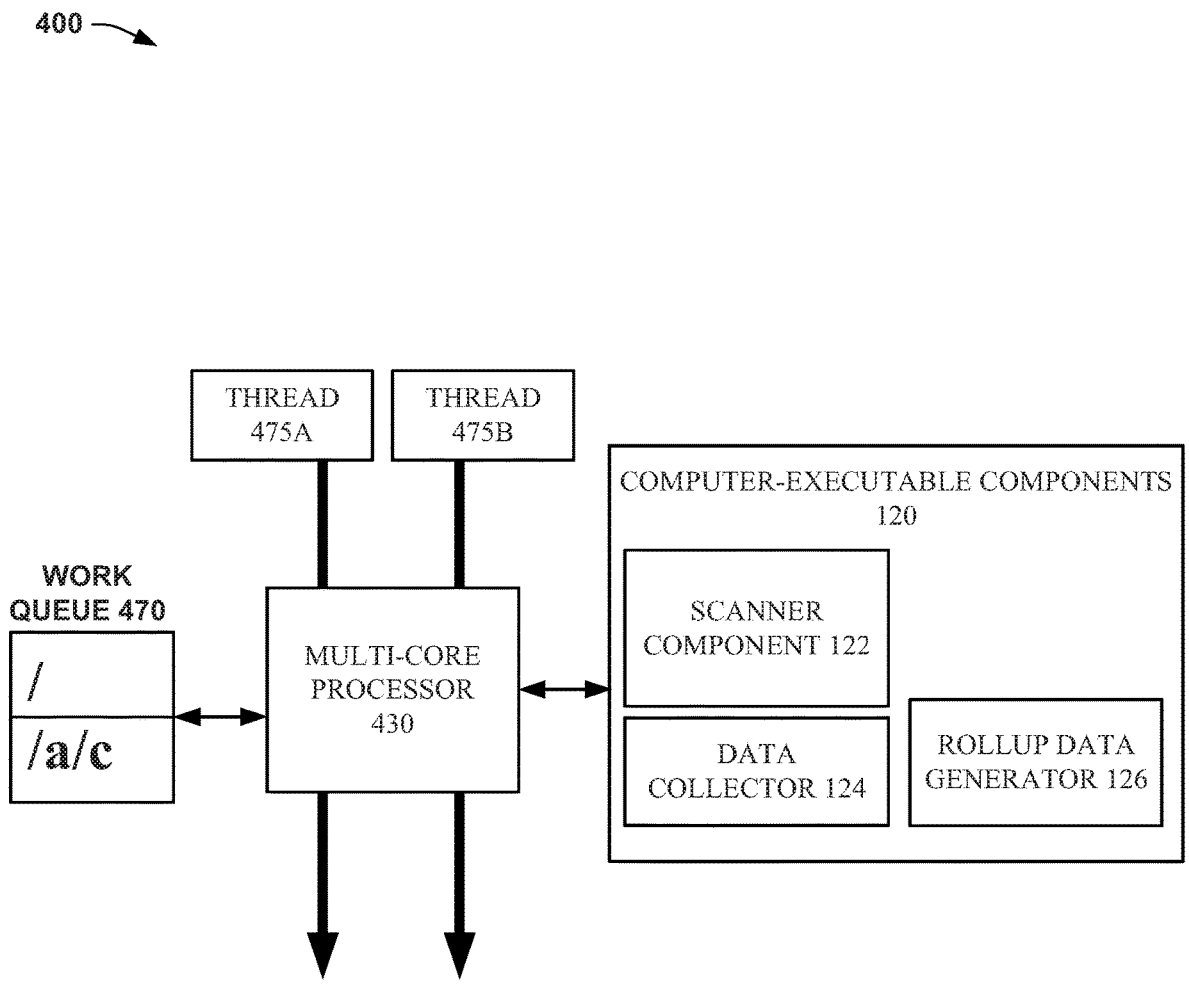
FIGS. 4-5 illustrate a non-limiting example of employing a multi-core processor using at least two threads to select tasks from a work-queue, in accordance with one or more embodiments described herein.
Figure 5:
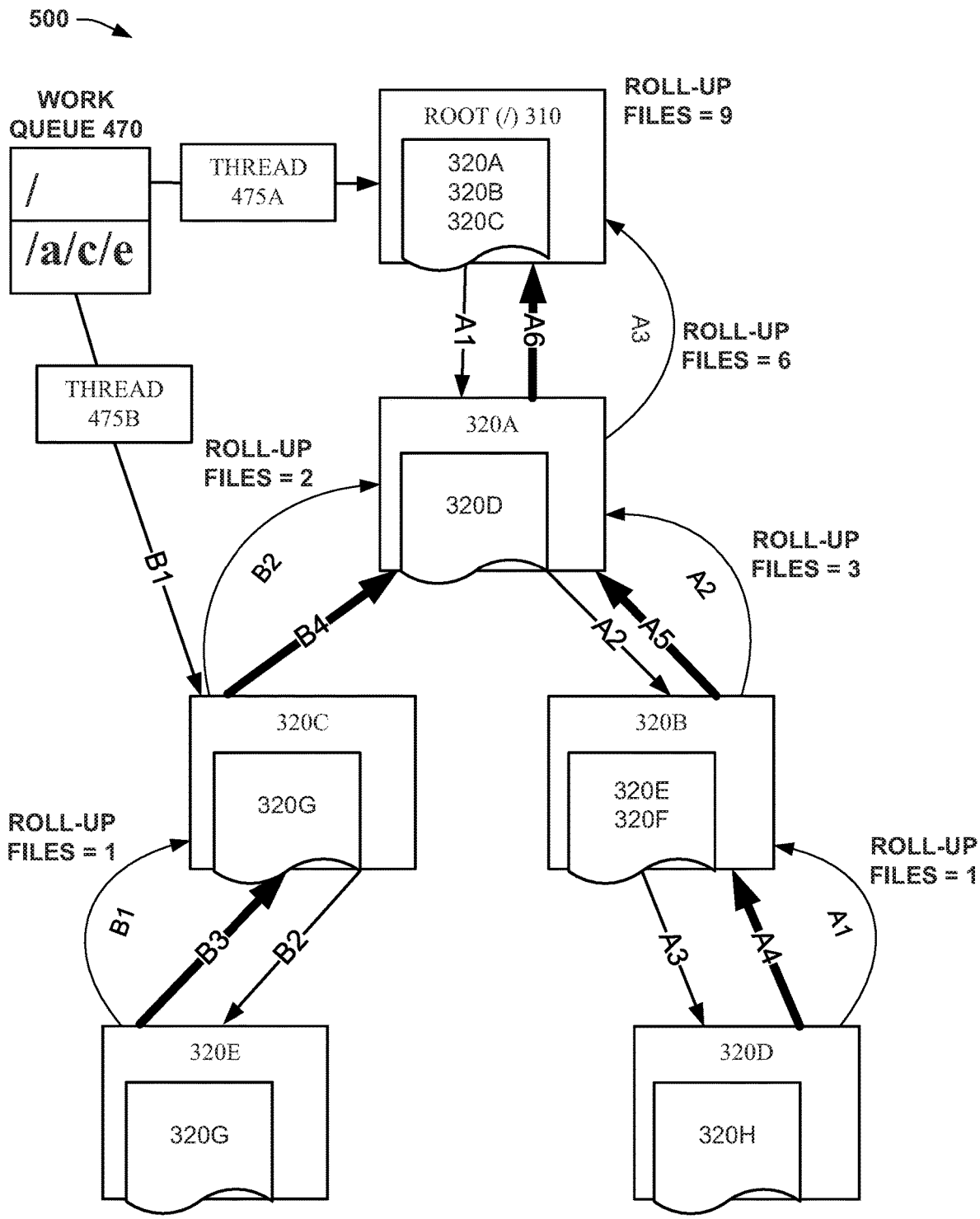

FIGS. 4-5 illustrate a non-limiting example of a multi-core processor using at least two threads to select tasks from a work-queue, in accordance with one or more embodiments described herein. Repetitive description of like elements and/or processes employed in respective embodiments is omitted for sake of brevity.

As noted above, in one or more embodiments, scanner component 122, data collector 124, and roll-up data generator 126 can perform operations that can be centered around one node at a time for one branch of nodes at a time. As discussed below, one or more additional embodiments can combine implementation approach specific to the conditions described herein, with the multitasking capacity of multi-threaded processor 430.

In one or more embodiments, rules can be used to improve data consistency when using multiple threads. These rules can include, but are not limited to, mandating that only one thread can update a node at a time. In addition, as discussed further with FIG. 5 below, a rule can mandate that a node can only be closed and written to the first data structure when all threads who could need node data have completed all tasks associated with the node.

One approach to multitasking that can be employed by one or more embodiments uses work queue 470 to, as discussed below with FIG. 5, queue tasks for system components including, but not limited to, computer-executable components 120. Available threads 475A-B can perform tasks out of the queue, with these tasks in some circumstances, being in the same area of the same data structure, e.g., first data structure 165. In one or more embodiments, a configurable number of threads can be selected based on hardware capacity and processing requirements.

In additional or alternative embodiments, work queue 470 can be a blocking queue.

In an additional embodiment, work queue 470 can be frequently sorted in canonical alphabetical order. In some circumstances, when this sorting is applied to nodes that are referenced by file system directory paths, threads that select consecutive tasks from work queue 470 can have a higher likelihood of working on proximate portions of first data structure 165. For example, two queue orders are included as an example below:

Queue 1
/a/d/
/a/b/c/d/
/c/d/e/
/a/b/e/f/
/a/f/
/a/b/d/e/
Queue 2
/a/b/c/d/
/a/b/d/e/
/a/b/e/f/
/a/d/
/a/f/
/c/d/e/

In the examples above, both queues contain the same list of directory pathnames that can be used to label nodes that correspond to directories. Queue 1 is unsorted, and Queue 2 is sorted in accordance with the embodiments described above. In an example where three threads are assigned to process the first three tasks of each, it can be noted that, while Queue 1 includes pathnames that at random distances from each other, Queue 2 has tasks that can resolve three branches of /a/b/, e.g., branched for nodes /d, /e, /f. These tasks are proximate enough that they could be advantageously processed in parallel by at least three threads.

As depicted in FIG. 5, a traversal of data structure 500 based on a starting point of root node 310 can commence based on the root node 310 path in work queue 470 being allocated to thread 475A. As depicted in FIG. 5, thread 475A can follow a route A1-A6, whereby nodes 320D and 320B have respective aggregated values written in first data structure 165 and provide aggregated file total data to node 320A.

Operating in parallel, thread 475B can receive a task from work queue 470 corresponding to nodes 320A/320C/320E. This task is set to work in parallel with thread 475A to complete analysis and aggregation if a branch of nodes beginning with 320A, e.g., handling the subbranch not processed by thread 475A, e.g., nodes 320C and 320E. In accordance with processes described above, thread 475B can follow route B1-B4 to aggregate file total node data from nodes 320E and 320C, providing the aggregate value (e.g., 2) to be used to close out node 320A.

As noted above, to reduce the likelihood of inconsistency, one or more embodiments can restrict threads 474A-B with rules, e.g., a node can only be closed and written to the first data structure when all threads who could need node data have completed all tasks associated with the node. Following this rule, because the aggregated file total of node 320A depends upon both of the descendant nodes, closing node 320A can only be done when aggregate data is received from thread 475B.

In should be noted that the above multi-core example uses a figure having routes A1-A6 and routes B1-B4 to show the traversal paths of threads 475A-B. While threads can be assigned tasks that can follow these paths, other approaches can be used. For example, in one or more embodiments, tasks can be allocated to threads that only reference single node, e.g., having a pathname in queue 470 only directs a thread to process node 320D. Once completed, node 320D can be closed and the aggregated total number of files can be provided to node 320B for aggregation.

Figure 6:
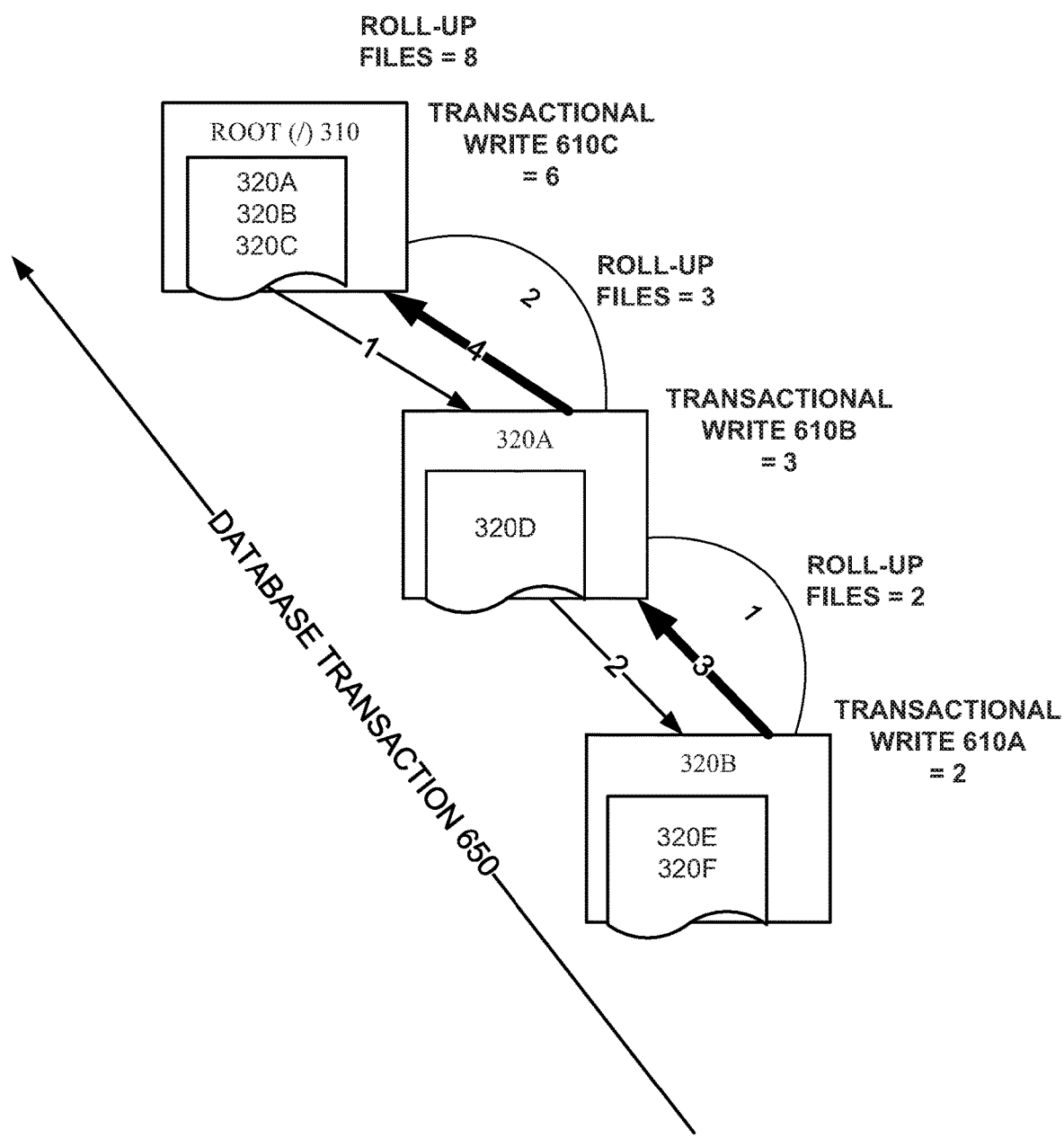
FIG. 6 illustrates non-limiting example approaches to mitigating data inconsistencies caused by processing described herein irregularly stopping, in accordance with one or more embodiments.

FIG. 6 illustrates non-limiting example approaches to mitigating data inconsistencies caused by embodiments irregularly stopping, in accordance with one or more embodiments. For purposes of brevity, description of like elements and/or processes employed in other embodiments is omitted.

In one or more embodiments, at least because, as described above with FIGS. 3 and 5, processes described herein can utilize memory 140 to process nodes (e.g., using second data structure as a temporary store of node data while scanner component 122 traverses the structure), when the system irregularly stops functioning during the traversal and aggregation process, different approaches can be used by one or more embodiments to maintain data consistency between data processed before the stop and the data that was not processed before the stop.

In an example depicted in FIG. 6, at a point where nodes 310, 320A-B, and 320D have been scanned up to node 320D, the 320D and 320B aggregate data have been written to disk, the shadow data cleared for nodes 320D and 320B, and scanner component 122 has returned analysis to node 320A. When an irregular system stop occurs at this point (e.g., before roll-up data has been written for 320A), the data can be inconsistent along the branch, e.g., node 320A can show no aggregated node data (e.g., no total number of files for the combination of nodes 320B and 320D), while node 320B can show aggregated data for node 320D.

In an approach to reducing the likelihood of inconsistent data due the situation above, one or more embodiments can, instead of writing data to first data structure upon closing of a node (e.g., node 320D data is written when scanner component 122 traverses to ancestor node 320B), one or more embodiments can build database write commands into a database transaction 650 (e.g., transactional writes 610A-610C), then, after an interval, the database transaction 650 can be committed to the database (e.g., first data structure 165). This approach can reduce the likelihood of inconsistencies, because in some implementations, (e.g., based on sorted work queue 570) data that is likely to be inter-reliant (e.g., data processed proximately in time) can either be committed or rolled back at the same time. An example time interval between commits using this approach can be 5-10 seconds, e.g., a time where it can be very likely a branch will be successfully processed.

In alternative embodiment, used, for example, with a database that does not support transactional write operations, the system can reexecute the tasks that were partially completed, overwriting inconsistent data, and maintaining consistency for the aggregated node data.

Additional embodiments can also reduce the likelihood of data inconsistencies by caching read commands during node processing Like the approach that can delay write commands until a large group of commands can be executed at once, one or more embodiments can determine that a read command has been received that is directed toward a group of data being processed, and delay the execution of the read command until a likelihood that processing has been completed.

One approach that can be used to cache read commands is to temporarily store these commands in second data structure 145. In one or more embodiments, this caching could be done for a set number of read commands or a set amount of memory. In additional embodiments, a cache eviction algorithm (e.g., least recently used (LRU)) can be applied to improve the operation of this approach for improving data consistency during node data aggregation operations described herein.

Figure 7:
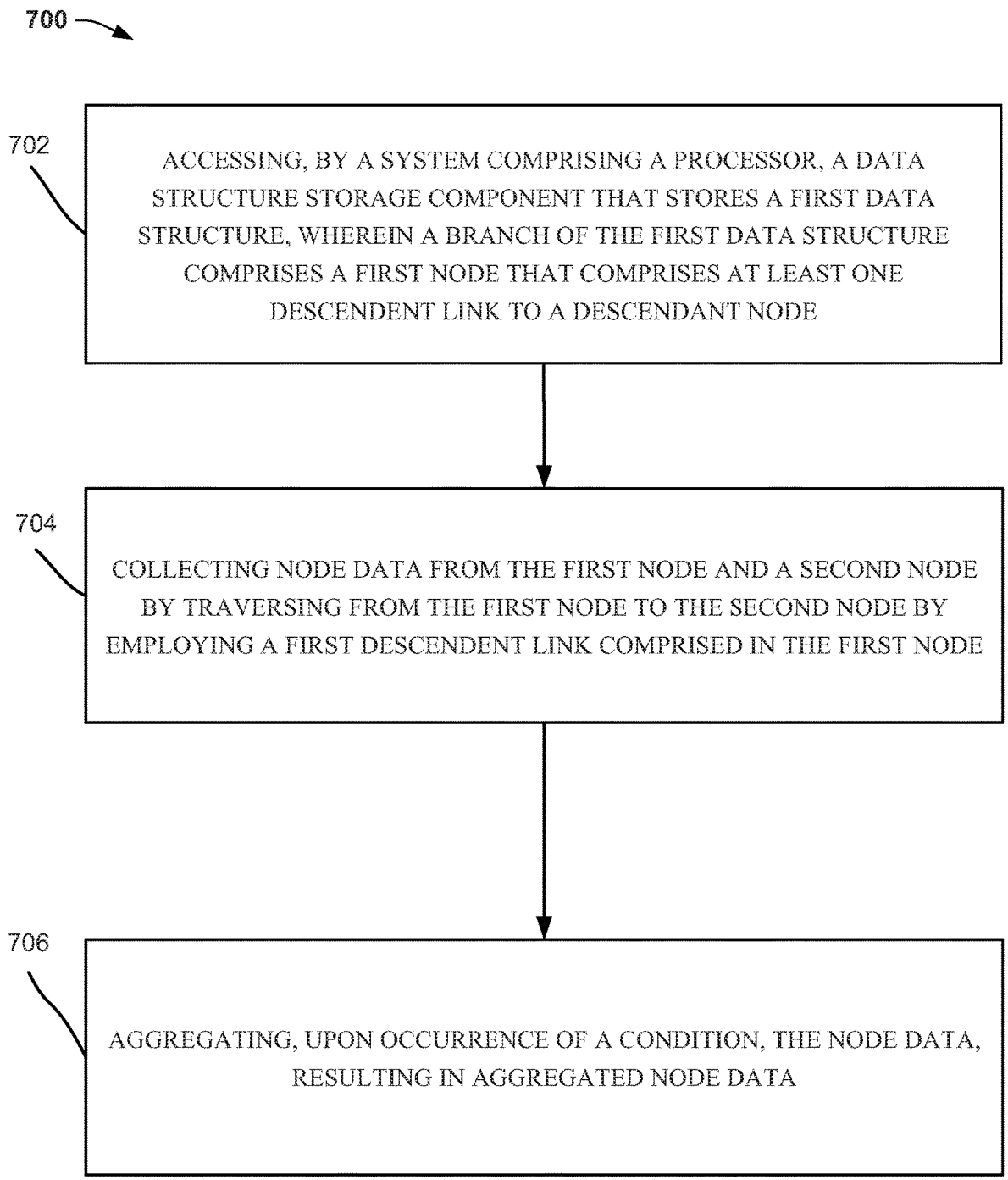
FIG. 7 illustrates an example flow diagram for a method that can facilitate incremental aggregation of metadata for a file storage system, in accordance with one or more embodiments.

FIG. 7 illustrates an example flow diagram for a method 700 that can facilitate incremental aggregation of metadata for a file storage system, in accordance with one or more embodiments. For purposes of brevity, description of like elements and/or processes employed in other embodiments is omitted.

At element 702, method 700 can comprise accessing, by a system 100 comprising a processor 130, a data structure storage component 160 that stores a first data structure 165, wherein a branch (e.g., nodes 320A-B, and 320D) of the first data structure comprises a first node (e.g., node 320A) that comprises at least one descendent link to a descendent node (e.g., node 320B).

At element 704, method 700 can comprise collecting node data (e.g., node 320B references two objects) from the first node and a second node by traversing from the first node to the second node (e.g., node 320D) by employing a first descendent link comprised in the first node. At element 706, method 700 can comprise aggregating (e.g., node 320D data is combined with node 320B data), upon occurrence of a condition (e.g., node 320D has no descendants), the node data, resulting in aggregated node data (e.g., roll-up files for node 320B=3).

Figure 8:
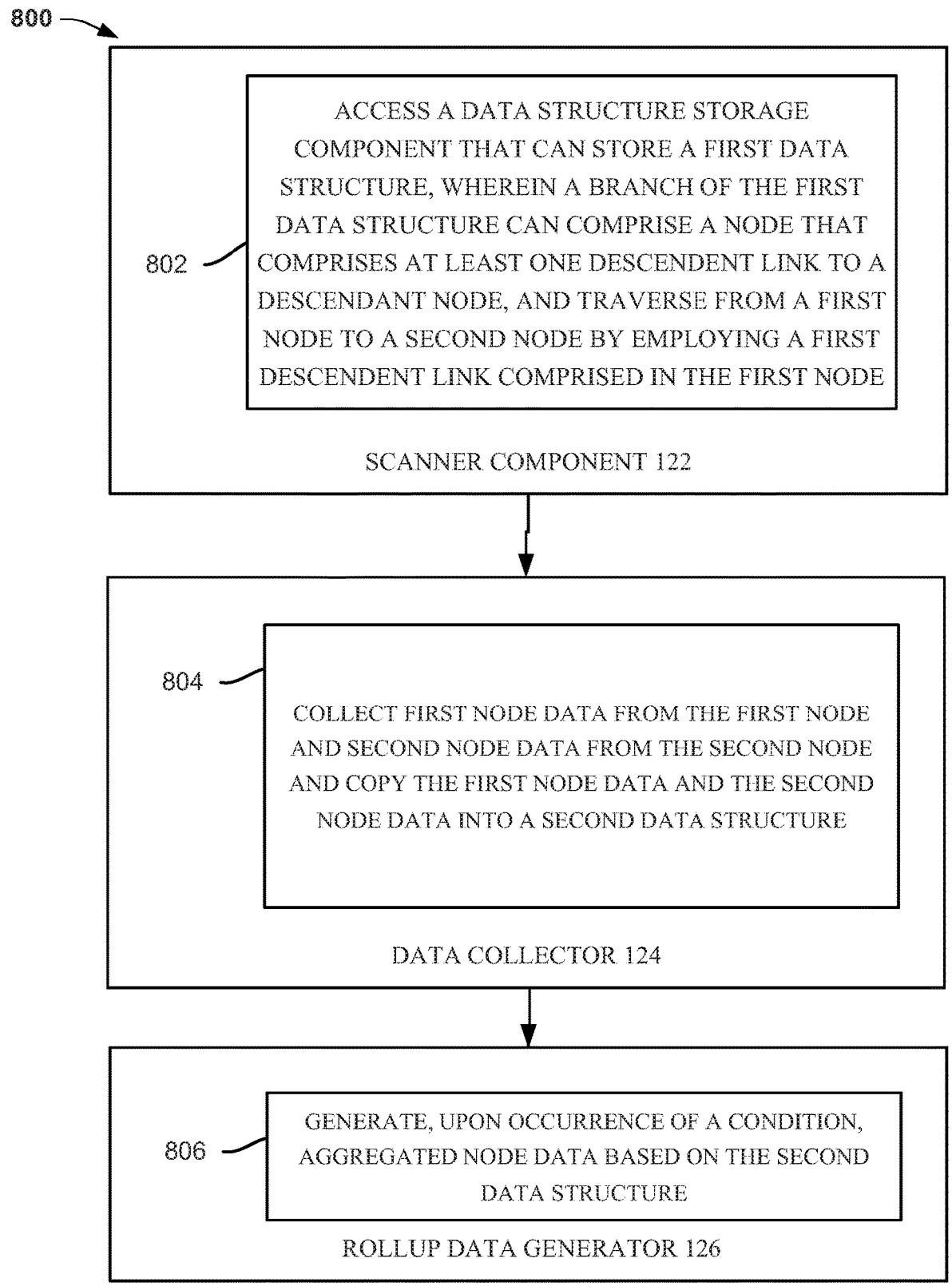
FIG. 8 is a flow diagram representing example operations of system comprising incremental aggregation of metadata for a file storage system, in accordance with one or more embodiments.

FIG. 8 is a flow diagram representing example operations of system comprising scanner component 122, data collector 124, and roll-up data generator 126, in accordance with one or more embodiments. For purposes of brevity, description of like elements and/or processes employed in other embodiments is omitted.

Scanner component 122 can be configured to execute processes that can include accessing a data structure storage component that can store a first data structure, where a branch of the first data structure can comprise a node that comprises at least one descendent link to a descendant node. Scanner component 122 can further traverse from a first node to a second node by employing a first descendent link comprised in the first node. Data collector 124 can be configured to collect first node data from the first node and second node data from the second node and copy the first node data and the second node data into a second data structure. Rollup data generator 126 can be configured to generate, upon occurrence of a condition, aggregated node data based on the second data structure.

Figure 9:
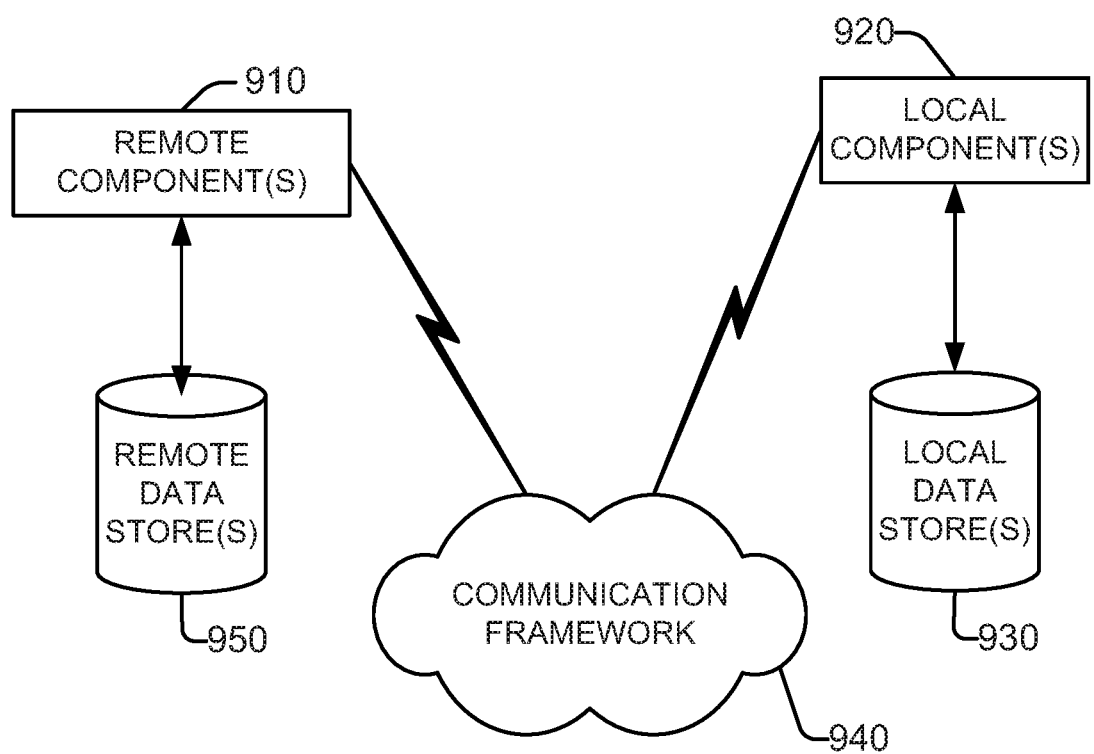
FIG. 9 depicts an example schematic block diagram of a computing environment with which the disclosed subject matter can interact, in accordance with one or more embodiments.

FIG. 9, in order to provide a context for the various aspects of the disclosed subject matter, is intended to provide a brief, general description of a suitable environment in which the various aspects of the disclosed subject matter can be implemented. The system 900 comprises one or more local component(s) 920. The local component(s) 920 can be hardware and/or software (e.g., threads, processes, computing devices).

One possible communication between a remote component(s) 910 and a local component(s) 920 can be in the form of a data packet adapted to be transmitted between two or more computer processes. Another possible communication between a remote component(s) 910 and a local component(s) 920 can be in the form of circuit-switched data adapted to be transmitted between two or more computer processes in radio time slots. The system 900 comprises a communication framework 940 that can be employed to facilitate communications between the remote component(s) 910 and the local component(s) 920, and can comprise an air interface, e.g., Uu interface of a UMTS network, via a long-term evolution (LTE) network, etc. Remote component(s) 910 can be operably connected to one or more remote data store(s) 950, such as a hard drive, solid state drive, SIM card, device memory, etc., that can be employed to store information on the remote component(s) 910 side of communication framework 940. Similarly, local component(s) 920 can be operably connected to one or more local data store(s) 930, that can be employed to store information on the local component(s) 920 side of communication framework 940.

While the subject matter has been described above in the general context of computer-executable instructions of a computer program that runs on a computer and/or computers, those skilled in the art will recognize that the disclosed subject matter also can be implemented in combination with other program modules. Generally, program modules comprise routines, programs, components, data structures, etc. that performs particular tasks and/or implement particular abstract data types.

In the subject specification, terms such as "store," "storage," "data store," "data storage," "database," and substantially any other information storage component relevant to operation and functionality of a component, refer to "memory components," or entities embodied in a "memory" or components comprising the memory. It is noted that the memory components described herein can be either volatile memory or nonvolatile memory, or can comprise both volatile and nonvolatile memory, by way of illustration, and not limitation, volatile memory 1020 (see below), non-volatile memory 1022 (see below), disk storage 1024 (see below), and memory storage, e.g., local data store(s) 930 and remote data store(s) 950, see below. Further, nonvolatile memory can be included in read only memory, programmable read only memory, electrically programmable read only memory, electrically erasable read only memory, or flash memory. Volatile memory can comprise random access memory, which acts as external cache memory. By way of illustration and not limitation, random access memory is available in many forms such as synchronous random access memory, dynamic random access memory, synchronous dynamic random access memory, double data rate synchronous dynamic random access memory, enhanced synchronous dynamic random access memory, SynchLink dynamic random access memory, and direct Rambus random access memory. Additionally, the disclosed memory components of systems or methods herein are intended to comprise, without being limited to comprising, these and any other suitable types of memory.

Moreover, it is noted that the disclosed subject matter can be practiced with other computer system configurations, comprising single-processor or multiprocessor computer systems, mini-computing devices, mainframe computers, as well as personal computers, hand-held computing devices (e.g., personal digital assistant, phone, watch, tablet computers, netbook computers, . . . ), microprocessor-based or programmable consumer or industrial electronics, and the like. The illustrated aspects can also be practiced in distributed computing environments where tasks are performed by remote processing devices that are linked through a communications network; however, some if not all aspects of the subject disclosure can be practiced on stand-alone computers. In a distributed computing environment, program modules can be located in both local and remote memory storage devices.

Figure 10:
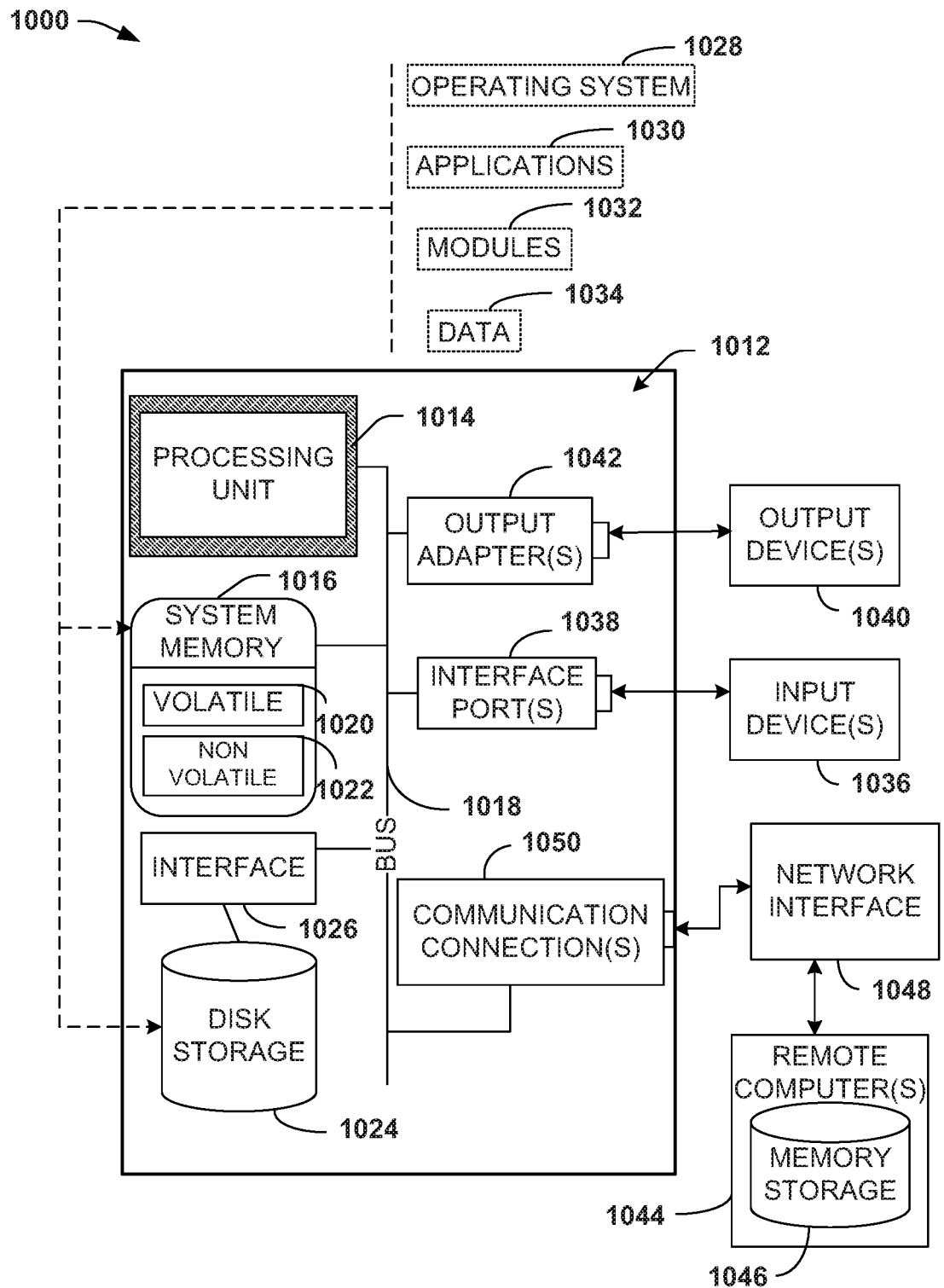
FIG. 10 illustrates an example block diagram of a computing system operable to execute the disclosed systems and methods in accordance with various aspects and implementations of the subject disclosure.

FIG. 10 illustrates a block diagram of a computing system 1000 operable to execute the disclosed systems and methods in accordance with one or more embodiments/implementations described herein. Computer 1012 can comprise a processing unit 1014, a system memory 1016, and a system bus 1018. System bus 1018 couples system components comprising, but not limited to, system memory 1016 to processing unit 1014. Processing unit 1014 can be any of various available processors. Dual microprocessors and other multiprocessor architectures also can be employed as processing unit 1014.

System bus 1018 can be any of several types of bus structure(s) comprising a memory bus or a memory controller, a peripheral bus or an external bus, and/or a local bus using any variety of available bus architectures comprising, but not limited to, industrial standard architecture, micro-channel architecture, extended industrial standard architecture, intelligent drive electronics, video electronics standards association local bus, peripheral component interconnect, card bus, universal serial bus, advanced graphics port, personal computer memory card international association bus, Firewire (Institute of Electrical and Electronics Engineers 1394), and small computer systems interface.

System memory 1016 can comprise volatile memory 1020 and non-volatile memory 1022. A basic input/output system, containing routines to transfer information between elements within computer 1012, such as during start-up, can be stored in non-volatile memory 1022. By way of illustration, and not limitation, non-volatile memory 1022 can comprise read only memory, programmable read only memory, electrically programmable read only memory, electrically erasable read only memory, or flash memory. Volatile memory 1020 comprises read only memory, which acts as external cache memory. By way of illustration and not limitation, read only memory is available in many forms such as synchronous random access memory, dynamic read only memory, synchronous dynamic read only memory, double data rate synchronous dynamic read only memory, enhanced synchronous dynamic read only memory, SynchLink dynamic read only memory, Rambus direct read only memory, direct Rambus dynamic read only memory, and Rambus dynamic read only memory.

Computer 1012 can also comprise removable/non-removable, volatile/non-volatile computer storage media. FIG. 10 illustrates, for example, disk storage 1024. Disk storage 1024 comprises, but is not limited to, devices like a magnetic disk drive, floppy disk drive, tape drive, flash memory card, or memory stick. In addition, disk storage 1024 can comprise storage media separately or in combination with other storage media comprising, but not limited to, an optical disk drive such as a compact disk read only memory device, compact disk recordable drive, compact disk rewritable drive or a digital versatile disk read only memory. To facilitate connection of the disk storage 1024 to system bus 1018, a removable or non-removable interface is typically used, such as interface 1026.

Computing devices typically comprise a variety of media, which can comprise computer-readable storage media or communications media, which two terms are used herein differently from one another as follows.

Computer-readable storage media can be any available storage media that can be accessed by the computer and comprises both volatile and nonvolatile media, removable and non-removable media. By way of example, and not limitation, computer-readable storage media can be implemented in connection with any method or technology for storage of information such as computer-readable instructions, program modules, structured data, or unstructured data. Computer-readable storage media can comprise, but are not limited to, read only memory, programmable read only memory, electrically programmable read only memory, electrically erasable read only memory, flash memory or other memory technology, compact disk read only memory, digital versatile disk or other optical disk storage, magnetic cassettes, magnetic tape, magnetic disk storage or other magnetic storage devices, or other tangible media which can be used to store desired information. In this regard, the term "tangible" herein as may be applied to storage, memory or computer-readable media, is to be understood to exclude only propagating intangible signals per se as a modifier and does not relinquish coverage of all standard storage, memory or computer-readable media that are not only propagating intangible signals per se. In an aspect, tangible media can comprise non-transitory media wherein the term "non-transitory" herein as may be applied to storage, memory or computer-readable media, is to be understood to exclude only propagating transitory signals per se as a modifier and does not relinquish coverage of all standard storage, memory or computer-readable media that are not only propagating transitory signals per se. Computer-readable storage media can be accessed by one or more local or remote computing devices, e.g., via access requests, queries or other data retrieval protocols, for a variety of operations with respect to the information stored by the medium. As such, for example, a computer-readable medium can comprise executable instructions stored thereon that, in response to execution, can cause a system comprising a processor to perform operations, comprising determining a mapped cluster schema, altering the mapped cluster schema until a rule is satisfied, allocating storage space according to the mapped cluster schema, and enabling a data operation corresponding to the allocated storage space, as disclosed herein.

Communications media typically embody computer-readable instructions, data structures, program modules or other structured or unstructured data in a data signal such as a modulated data signal, e.g., a carrier wave or other transport mechanism, and comprises any information delivery or transport media. The term "modulated data signal" or signals refers to a signal that has one or more of its characteristics set or changed in such a manner as to encode information in one or more signals. By way of example, and not limitation, communication media comprise wired media, such as a wired network or direct-wired connection, and wireless media such as acoustic, RF, infrared and other wireless media.

It can be noted that FIG. 10 describes software that acts as an intermediary between users and computer resources described in a suitable operating environment, e.g., computing system 1000. Such software comprises an operating system 1028. Operating system 1028, which can be stored on disk storage 1024, acts to control and allocate resources of computer 1012. System applications 1030 take advantage of the management of resources by operating system 1028 through program modules 1032 and program data 1034 stored either in system memory 1016 or on disk storage 1024. It is to be noted that the disclosed subject matter can be implemented with various operating systems or combinations of operating systems.

A user can enter commands or information into computer 1012 through input device(s) 1036. In some embodiments, a user interface can allow entry of user preference information, etc., and can be embodied in a touch sensitive display panel, a mouse/pointer input to a graphical user interface (GUI), a command line controlled interface, etc., allowing a user to interact with computer 1012. Input devices 1036 comprise, but are not limited to, a pointing device such as a mouse, trackball, stylus, touch pad, keyboard, microphone, joystick, game pad, satellite dish, scanner, TV tuner card, digital camera, digital video camera, web camera, cell phone, smartphone, tablet computer, etc. These and other input devices connect to processing unit 1014 through system bus 1018 by way of interface port(s) 1038. Interface port(s) 1038 comprise, for example, a serial port, a parallel port, a game port, a universal serial bus, an infrared port, a Bluetooth port, an IP port, or a logical port associated with a wireless service, etc. Output device(s) 1040 use some of the same type of ports as input device(s) 1036.

Thus, for example, a universal serial bus port can be used to provide input to computer 1012 and to output information from computer 1012 to an output device 1040. Output adapter 1042 is provided to illustrate that there are some output devices 1040 like monitors, speakers, and printers, among other output devices 1040, which use special adapters. Output adapters 1042 comprise, by way of illustration and not limitation, video and sound cards that provide means of connection between output device 1040 and system bus 1018. It should be noted that other devices and/or systems of devices provide both input and output capabilities such as remote computer(s) 1044.

Computer 1012 can operate in a networked environment using logical connections to one or more remote computers, such as remote computer(s) 1044. Remote computer(s) 1044 can be a personal computer, a server, a router, a network PC, cloud storage, a cloud service, code executing in a cloud computing environment, a workstation, a microprocessor-based appliance, a peer device, or other common network node and the like, and typically comprises many or all of the elements described relative to computer 1012. A cloud computing environment, the cloud, or other similar terms can refer to computing that can share processing resources and data to one or more computer and/or other device(s) on an as needed basis to enable access to a shared pool of configurable computing resources that can be provisioned and released readily. Cloud computing and storage solutions can store and/or process data in third-party data centers which can leverage an economy of scale and can view accessing computing resources via a cloud service in a manner similar to a subscribing to an electric utility to access electrical energy, a telephone utility to access telephonic services, etc.

For purposes of brevity, only a memory storage device 1046 is illustrated with remote computer(s) 1044. Remote computer(s) 1044 is logically connected to computer 1012 through a network interface 1048 and then physically connected by way of communication connection 1050. Network interface 1048 encompasses wire and/or wireless communication networks such as local area networks and wide area networks. Local area network technologies comprise fiber distributed data interface, copper distributed data interface, Ethernet, Token Ring and the like. Wide area network technologies comprise, but are not limited to, point-to-point links, circuit-switching networks like integrated services digital networks and variations thereon, packet switching networks, and digital subscriber lines. As noted below, wireless technologies may be used in addition to or in place of the foregoing.

Communication connection(s) 1050 refer(s) to hardware/software employed to connect network interface 1048 to system bus 1018. While communication connection 1050 is shown for illustrative clarity inside computer 1012, it can also be external to computer 1012. The hardware/software for connection to network interface 1048 can comprise, for example, internal and external technologies such as modems, comprising regular telephone grade modems, cable modems and digital subscriber line modems, integrated services digital network adapters, and Ethernet cards.

The above description of illustrated embodiments of the subject disclosure, comprising what is described in the Abstract, is not intended to be exhaustive or to limit the disclosed embodiments to the precise forms disclosed. While specific embodiments and examples are described herein for illustrative purposes, various modifications are possible that are considered within the scope of such embodiments and examples, as those skilled in the relevant art can recognize.

In this regard, while the disclosed subject matter has been described in connection with various embodiments and corresponding Figures, where applicable, it is to be understood that other similar embodiments can be used or modifications and additions can be made to the described embodiments for performing the same, similar, alternative, or substitute function of the disclosed subject matter without deviating therefrom. Therefore, the disclosed subject matter should not be limited to any single embodiment described herein, but rather should be construed in breadth and scope in accordance with the appended claims below.

As it employed in the subject specification, the term "processor" can refer to substantially any computing processing unit or device comprising, but not limited to comprising, single-core processors; single-processors with software multithread execution capability; multi-core processors; multi-core processors with software multithread execution capability; multi-core processors with hardware multithread technology; parallel platforms; and parallel platforms with distributed shared memory. Additionally, a processor can refer to an integrated circuit, an application specific integrated circuit, a digital signal processor, a field programmable gate array, a programmable logic controller, a complex programmable logic device, a discrete gate or transistor logic, discrete hardware components, or any combination thereof designed to perform the functions described herein. Processors can exploit nano-scale architectures such as, but not limited to, molecular and quantum-dot based transistors, switches and gates, in order to optimize space usage or enhance performance of user equipment. A processor may also be implemented as a combination of computing processing units.

As used in this application, the terms "component," "system," "platform," "layer," "selector," "interface," and the like are intended to refer to a computer-related entity or an entity related to an operational apparatus with one or more specific functionalities, wherein the entity can be either hardware, a combination of hardware and software, software, or software in execution. As an example, a component may be, but is not limited to being, a process running on a processor, a processor, an object, an executable, a thread of execution, a program, and/or a computer. By way of illustration and not limitation, both an application running on a server and the server can be a component. One or more components may reside within a process and/or thread of execution and a component may be localized on one computer and/or distributed between two or more computers. In addition, these components can execute from various computer readable media having various data structures stored thereon. The components may communicate via local and/or remote processes such as in accordance with a signal having one or more data packets (e.g., data from one component interacting with another component in a local system, distributed system, and/or across a network such as the Internet with other systems via the signal). As another example, a component can be an apparatus with specific functionality provided by mechanical parts operated by electric or electronic circuitry, which is operated by a software or a firmware application executed by a processor, wherein the processor can be internal or external to the apparatus and executes at least a part of the software or firmware application. As yet another example, a component can be an apparatus that provides specific functionality through electronic components without mechanical parts, the electronic components can comprise a processor therein to execute software or firmware that confers at least in part the functionality of the electronic components.

In addition, the term "or" is intended to mean an inclusive "or" rather than an exclusive "or." That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances.

While the invention is susceptible to various modifications and alternative constructions, certain illustrated implementations thereof are shown in the drawings and have been described above in detail. It should be understood, however, that there is no intention to limit the invention to the specific forms disclosed, but on the contrary, the intention is to cover all modifications, alternative constructions, and equivalents falling within the spirit and scope of the invention.

In addition to the various implementations described herein, it is to be understood that other similar implementations can be used or modifications and additions can be made to the described implementation(s) for performing the same or equivalent function of the corresponding implementation(s) without deviating therefrom. Still further, multiple processing chips or multiple devices can share the performance of one or more functions described herein, and similarly, storage can be affected across a plurality of devices. Accordingly, the invention is not to be limited to any single implementation, but rather is to be construed in breadth, spirit and scope in accordance with the appended claims.

What is claimed is:

1. A system, comprising:
a memory that stores a cache and computer executable components; and
a processor that executes the computer executable components stored in the memory, wherein the computer executable components comprise:
a scanner component to execute processes comprising:
accessing a data structure storage component that stores a first data structure, wherein a branch of the first data structure comprises a node that comprises at least one descendent link to a descendant node; and
traversing from a first node to a second node by employing a first descendent link comprised in the first node;
a data collector component to collect first node data from the first node and second node data from the second node and copy the first node data and the second node data into a second data structure, wherein the first and second node data respectively comprise information describing first and second objects referenced by the first node and the second node; and
a rollup data generator component to generate, upon occurrence of a condition, aggregated node data based on the second data structure, wherein the rollup data generator component stores the aggregated node data in the first data structure, and wherein the rollup data generator component further stores the aggregated node data in the first data structure based on a process comprising:
generating a first database write command for storage of a first portion of the aggregated node data for the second node;
generating a second database write command for storage of a second portion of the aggregated node data for the first node, wherein the rollup data generator component combines the first database write command and the second database write command into a database transaction; and
periodically committing the database transaction after an interval.

2. The system of claim 1, wherein the data collector component copying the first node data and the second node data into the second data structure comprises:
generating a shadow first node and a shadow second node in the second data structure;
copying the first node data into the shadow first node; and
copying the second node data into the shadow second node, wherein the rollup data generator component generates the aggregated node data based on the shadow first node and the shadow second node.

3. The system of claim 2, wherein the data structure storage component comprises a permanent storage device, and wherein the second data structure is cached in the memory.

4. The system of claim 3, wherein the rollup data generator component further removes the shadow first node and the shadow second node from the cache.

5. The system of claim 1, wherein the condition comprises an absence of a second descendent link from the second node.

6. The system of claim 1, wherein the node comprised in the first data structure corresponds a directory in a file storage system.

7. The system of claim 6, wherein objects referenced by the node correspond to files stored in the directory.

8. The system of claim 7, wherein the first node data further comprises a size in the file storage system of the files to which the objects referenced by the first node correspond.

9. The system of claim 1, wherein the processor is a multi-core processor that employs a first thread and a second thread to execute tasks from a queue, wherein a first instance of the scanner component traverses from the first node to the second node by employing the first thread to execute a first task from the queue, wherein the scanner component further stores a second task in the queue based on a second descendent link to a third node comprised in the first node, and wherein a second instance of the scanner component employs the second thread to execute the second task from the queue.

10. The system of claim 9, wherein the aggregated node data further comprises additional node data aggregated by the second thread, and wherein the aggregated node data is only stored in the first data structure after the first thread and the second thread have completed tasks associated with the first node.

11. A method, comprising:
accessing, by a system comprising a processor, a data structure storage component that stores a first data structure, wherein a branch of the first data structure comprises a first node that comprises at least one descendent link to a descendant node;
collecting first node data from the first node and second node data from a second node by traversing from the first node to the second node by employing a first descendent link comprised in the first node;
copying the first node data and the second node data into a second data structure, wherein the first and second node data respectively comprise information describing first and second objects referenced by the first node and the second nodes;
generating, upon occurrence of a condition, aggregated node data based on the second data structure; and
storing the aggregated node data in the first data structure based on a process comprising:
generating a first database write command for storing a first portion of the aggregated node data for the second node,
generating a second database write command for storing a second portion of the aggregated node data for the first node,
combining the first datastore write command and the second datastore write command into a datastore transaction; and
periodically committing the datastore transaction after an interval.

12. The method of claim 11, wherein the copying the first node data and the second node data into the second data structure comprises:
generating a shadow first node and a shadow second node in the second data structure;
copying the first node data into the shadow first node; and
copying the second node data into the shadow second node, wherein the generating the aggregated node data is based on the shadow first node and the shadow second node.

13. The method of claim 12, wherein the first node data comprises a number of objects that are referenced by the first node, and wherein the objects referenced by the first node correspond to files stored in a directory of directories, to which the first node corresponds.

14. The method of claim 12, wherein the first node data comprises a size of a file stored in a directory of the directories, to which the objects referenced by the first node correspond.

15. A non-transitory machine-readable storage medium comprising executable instructions that, when executed by a processor, facilitate performance of operations, the operations comprising:
   accessing, by a system comprising a processor, a data structure storage component that stores a first data structure, wherein a branch of the first data structure comprises a first node that comprises at least one descendent link to a descendant node;
   collecting first node data from the first node and second node data from a second node by employing a first descendent link comprised in the first node, wherein the first node data and the second node data respectively comprise first information and second information respectively describing a first object and a second object respectively referenced by the first node and the second node;
   copying the first node data and the second node data into a second data structure; and
   generating, upon occurrence of a condition, aggregated node data based on the second data structure,
   storing the aggregated node data in the first data structure based on a process comprising:
      generating a first database write command for storing a first portion of the aggregated node data for the second node,
      generating a second database write command for storing a second portion of the aggregated node data for the first node,
      combining the first database write command and the second database write command into a database transaction, and
      committing the database transaction after a defined interval.

16. The non-transitory machine-readable storage medium of claim 15, wherein the first node and the second node respectively correspond to directories in a file storage system.

17. The non-transitory machine-readable storage medium of claim 16, wherein the aggregated node data comprises a number of objects referenced by a respective node, and wherein objects referenced by the respective node correspond to files stored in a directory of the directories in the file storage system, to which the respective node corresponds.

18. The non-transitory machine-readable storage medium of claim 17, wherein the aggregated node data further comprises a size in the file storage system of the files to which the objects referenced by the respective node correspond.

19. The non-transitory machine-readable storage medium of claim 15, wherein copying the first node data and the second node data into the second data structure comprises:
   generating a shadow first node and a shadow second node in the second data structure;
   copying the first node data into the shadow first node; and
   copying the second node data into the shadow second node, wherein the generating the aggregated node data is based on the shadow first node and the shadow second node.

20. The non-transitory machine-readable storage medium of claim 19, wherein the data structure storage component comprises a permanent storage device, and wherein the second data structure is cached in memory.

* * * * *